United States Patent Office 2,822,344
Patented Feb. 4, 1958

2,822,344

UNSATURATED POLYESTER RESIN COMPOSITION CONTAINING A POLYMERIZATION PROMOTER AND PROCESS OF MAKING SAME

George Bliss Duhnkrack, Harrison, N. Y., assignor to American Cyanamid Company, New York, N. Y., a corporation of Maine No Drawing. Application July 6, 1954
Serial No. 441,639

14 Claims. (Cl. 260—45.4)

This invention relates to polymerizable ethylenically unsaturated polyhydric alcohol-polycarboxylic acid polyesters. More particularly, this invention relates to polyester resinous compositions containing a small but effective amount of a catalyst promoter system whereby polymerization (cure) of said composition may be controlled. Further, this invention relates to the polymerizable unsaturated polyester resinous compositions, their method of production and articles produced therefrom.

Polymerizable ethylenically unsaturated polyhydric alcohol-polycarboxylic acid polyesters have been prepared by the reaction of unsaturated polycarboxylic acids and polyhydric alcohols under an inert atmosphere and at elevated temperatures. Reaction is generally carried out until a desired acid number or a determined extent of esterification is realized. The unsaturated polyesters obtained are polymerizable and may be polymerized with a compound containing a polymerizable $CH_2=C<$ group in the presence of a polymerization catalyst to obtain a cured product. In order to effect cure of the polymerization mixture, heat is usually applied to expedite the polymerization reaction. When polymerization of the mixture is carried out at elevated temperatures, the exothermic heat of reaction may be so great that the resulting stresses and strains developed may often result in cured compositions which may be cracked or badly crazed. It is desirable to effect a rapid gellation of the polymerizable mixture, if possible, and then carry out the final cure of the material over an extended period of time. While no actual saving in the amount of heat required to effect cure would be realized, nevertheless, the danger of high exothermic heat being generated would be alleviated in the event gellation of the polymerizable mixture could be effected at a lower temperature and in a reduced period of time. Final cure of the resinous composition could then be carried out without the danger of the material cracking or crazing.

I have now found that the cure of polymerizable unsaturated polyester resinous compositions with a polymerizable $CH_2=C<$ group may be effected with a catalyst by the employment of a polymerization catalyst promoter system which will be discussed more fully below. By my invention, a controllable and practical curing cycle is obtained.

It is therefore an object of my invention to polymerize (cure) unsaturated polyester resinous compositions with a compound containing a polymerizable $CH_2=C<$ group. It is a further object of my invention to effect said cure by the employment of a polymerization catalyst promoter system. These and other objects of my invention will be discussed more fully hereinbelow.

In the preparation of the polymerizable unsaturated polyester resinous compositions of my invention, one may make use of the ethylenically unsaturated polycarboxylic acids such as maleic, fumaric, aconitic, itaconic and the like. The ethylenically unsaturated polycarboxylic acids include those known as the alpha, beta unsaturated acids. These unsaturated acids should be present in an amount approximating at least 20% by weight of the total weight of the polycarboxylic acids used and preferably in amounts varying between about 25% and 65% by weight, based on the total weight of polycarboxylic acid present. If it is desired to make use of polycarboxylic acids, which are free of non-benzenoid unsaturation, one could use such acids as phthalic, malonic, succinic, glutaric, sebacic and the like, but in amounts less than a larger proportion of the total amount of polycarboxylic acid present. Whenever available, the anhydrides of these acids may be used, e. g., maleic anhydride, phthalic anhydride, and as used herein polycarboxylic acids include the polycarboxylic anhydrides when available. Also, mixtures of the acids and anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in my invention are: ethylene glycol; diethylene glycol; propylene glycol; dipropylene glycol; butanediol-1,4; butanediol-1,3; butanediol-1,2; pentanediol-1,4; pentanediol-1,5; hexanediol-1,6; and the like. Additionally, such polyhydric alcohols as glycerol, 1,1'-isopropylidenebis(p-phenylenoxy)di-2-propanol, pentaerythritol, dipentaerythritol and the like may be used in my invention.

In the preparation of the polymerizable unsaturated polyesters, one may use the polyhydric alcohols and the polycarboxylic acids in a proportion substantially equally about mol for mol and preferably an excess of alcohol approximating 10% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and, preferably, an acid number from about 35 to 40. The polymerizable unsaturated polyesters are admixed with a monomeric compound containing the polymerizable $CH_2=C<$ group to give a composition that may be cured to a stable thermoset condition. One may use from about 10 parts by weight of the monomeric material to about 90 parts of the unsaturated polyester resin up to about 80 parts of the monomeric material to about 20 parts of the polymerized unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in my invention are such as styrene, side-chain alkyl and halo-substituted styrenes such as alpha-methylstyrene, alpha-chlorostyrene, alpha-ethylstyrene and the like or alkyl and halo ring-substituted styrene such as ortho-, meta- and para-alkyl styrenes such as o-methylstyrene, p-ethylstyrene, m-propylstyrene, 2,4-dimethylstyrene, 2,5-diethylstyrene, bromostyrene, chlorostyrene, dichlorostyrene and the like. Still further, one can make use of the allyl compounds such as dially phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like.

In the formulation of the resinous composition of my invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst employed may vary over rather wide limits to give varying catalyzed stability. Thus, from about 0.1% to about 10% by weight, based on the total weight of the polymerizable composition, may be used. Preferably, from about 0.05% to about 2% by weight of the catalyst, based on the total weight of the polymerizable resinous composition, gives the desired results. It is obvious that other proportions of the catalyst may be utilized when a faster or slower rate of cure is desired. Examples of the organic peroxide catalyst that may be used in my invention are such as benzoyl peroxide, succinyl peroxide, acetyl peroxide, methyl ethyl ketone peroxide, cumene hydroperoxide, tertiarybutyl hydroperoxide, cyclohexanone peroxide, perbenzoic acid, peracetic acid, anisoyl peroxide, toluyl peroxide, p-bromobenzoyl peroxide, tertiarybutyl perbenzoate, p-methane hydroperoxide, pinane hydroperoxide, diisopropylbenzene hydroperoxide, tertiarybutyl peracetate, 1 - cyclohexanol-1-hydroperoxide, furoyl peroxide and chloracetyl peroxide or any organic ozonide, such as diisopropylene ozonide, diisobutylene ozonide or a mixture of such substances may be used as the curing catalyst. Other free radical type polymerization catalysts that may also be used are such as $\alpha,\alpha$-azodiisobutyronitrile, the salts of inorganic per-acids, e. g., ammonium persulfate, sodium persulfate and the like.

In order to control the rate of polymerization during the cure of the resinous composition of my invention, it is advantageous to add a moderate amount of an inhibiting agent to the composition. The amount of inhibiting agent used is that required to give a minimum storage stability to the uncatalyzed mixture. Examples of inhibiting agents that may be used in my invention are such as hydroquinone, ditertiarybutyl hydroquinone, pyrogallol, tannic acid, tertiarybutyl catechol, or an organic amine such as aniline or phenylene diamine. Mixtures of the inhibiting agents may also be used if desired. About 0.008% of inhibiting agent by weight, based on the total weight of the resinous composition, usually gives satisfactory results.

The desirable and controllable curing cycle of the resinous composition of my invention is obtained by the addition to the polymerizable mixture of a small but effective amount of a promoter system for the catalyst. The promoter system employed comprises a compound or the salts thereof containing the basic imino group

in combination with a dissolved copper salt. The catalyst promotive effect obtained by the present promoter system is completely unexpected, particularly in view of the known inhibiting effect of copper upon the final cure of polymerizable ethylenically unsaturated compounds. In fact, the prior art has taught that the presence of copper should be avoided in order to obtain complete cure of polymerizable compounds. However, in certain instances wherein the presence of copper could not be avoided, the prior art has suggested various methods whereby the deleterious effects of the copper could be overcome. I have now found that an effective and controllable curing cycle for polymerizable unsaturated polyesters may be obtained when the present promoter system is employed.

As previously stated, one component of the promoter system has been found to be a compound or the salts thereof containing the basic amino group

wherein R is either hydrogen or an organic radical. From about 0.005% to about 0.2% by weight of the compound, based on the total weight of the resinous composition, may be employed. Generally, however, from about 0.01% to about 0.1% by weight of the compound containing the basic imino group is satisfactory.

The remaining portion of the promoter system comprises a copper salt. The amount of the copper salt that is introduced into the resinous composition is calculated as dissolved metallic copper and may vary from as little as 0.001 part per million to as high as 10 parts per million, based on the total weight of the resinous composition. The preferred amount of the metallic salt introduced into the resinous composition and calculated as parts per million of dissolved metallic copper is within the order of from about 0.01 to about 0.5. The components of the promoter system may be introduced into the resinous composition at any point prior to the cure thereof.

After the promoter has been introduced into the composition, the desired polymerization catalyst is then also introduced therein and the resinous material cured. I have found that an efficient process for introducing the promoter system into the resinous composition is to dissolve the components in a suitable solvent and then to stir this solution into the resinous material. For example, the compound containing the basic imino group may be prepared as a 10% solution in a polyhydric alcohol such as diethylene glycol and the copper salt then added to the solution. When the promoter system is thus prepared, the amount of the copper salt calculated as parts of dissolved metallic copper present may vary in concentration from about one part per million to about ten thousand parts per million, preferably from about ten parts per million to about one thousand parts per million in the promoter solution. Inasmuch as the concentration of the organic compound containing the basic imino group and the concentration of the copper salt in the promoter solution are known, the desired amount of the solution may then be introduced into the polymerizable reaction mixture in order to obtain the desired amount of such component in the resinous composition.

Inasmuch as the presence of the catalyst in the material would cause a spontaneous cure, it is necessary that the catalyst not be introduced into the composition until just prior to its cure. Alternative methods of introducing the components into the polymerizable mixture will be apparent to those skilled in the art. For example, the copper salt may be dissolved into the polymerizable mixture and the remaining component of the promoter system introduced therein in a suitable solvent. Alternatively, both components of the promoter system may be introduced into the polymerizable mixture during the formulation of the resinous composition and the cure of the material then effected by the introduction of a suitable catalyst therein.

In order that those skilled in the art may more fully understand the inventive concept herein advanced, the following examples are given by way of illustration and not limitation unless otherwise noted in the appended claims. All parts are by weight.

*Example 1*

Into a suitable reaction vessel were introduced 252 parts of propylene glycol, 296 parts of phthalic anhydride and 106 parts of fumaric acid. Esterification was carried out at an elevated temperature and under an inert atmosphere until an acid number of between 30-40 was reached. The polymerizable unsaturated polyester was then combined with styrene in a weight ratio of 62:38, respectively.

In order to cure the polymerizable resinous mixture, 0.01% by weight based on the weight of the mixture of benzamidine hydrochloride and sufficient copper chloride to yield 10 parts per million of copper calculated as dissolved metallic copper were introduced therein. Cure of the resin was effected upon the addition of 1% by weight based on the total weight of cumene hydroperoxide and the application of heat. After the resin gelled, final cure of the material produced a clear uncrazed casting.

Example 2

The preceding example was repeated except that the unsaturated polymerizable polyester was combined with methylstyrene. Comparable results were obtained upon cure of the resinous composition.

Example 3

504 parts of propylene glycol, 296 parts of phthalic anhydride and 294 parts of maleic anhydride were reacted at an elevated temperature and under an inert atmosphere to yield an unsaturated polymerizable polyester having an acid number of from 30-40. To 72 parts of the polyester were added 28 parts of styrene to form the polymerizable mixture.

0.01% by weight based on the weight of the polymerizable mixture of benzamidine hydrochloric and sufficient copper chloride to yield 0.1 part per million of copper calculated as dissolved metallic copper were introduced into the mixture. The resinous composition was cured upon the application of heat after 1% by weight of cumene hydroperoxide had been added thereto.

Example 4

An unsaturated polymerizable polyester was prepared by reacting at an elevated temperature and under an inert atmosphere 668 parts diethylene glycol, 584 parts of adipic acid and 212 parts of fumaric acid. The polymerizable resinous composition was prepared by adding 1 part of styrene to 2 parts of the polyester.

A catalyst promoter system in an amount such that the polymerizable mixture contained 0.01% by weight of ethylene guanidine hydrochloride and 0.4 part per million of copper naphthenate calculated as dissolved copper metal was added. The mixture cured to an uncrazed condition upon the addition of 1% benzoyl peroxide and the application of heat.

Example 5

100 parts of unsaturated polymerizable polyester prepared in accordance with Example 2 were combined with 61.5 parts of styrene. The gel time of the polymerizable mixture was then determined by adding thereto 0.01% by weight based on the total weight of benzamidine hydrochloride, 1% by weight of cumene hydroperoxide and varying amounts of copper salts. The results obtained are set forth in the following table:

| Sample No. | Percent By Wt. Benzamidine HCl | Percent By Wt. Cumene Hydroperoxide | Parts per Million Cu | 150° F. Gel Time (Min.) |
| --- | --- | --- | --- | --- |
| 1 | 0 | 1 | 0 | >36 |
| 2 | 0.01 | 1 | 10 | 9.1 |
| 3 | 0.01 | 1 | 1 | 7.0 |
| 4 | 0.01 | 1 | 0.1 | 6.5 |
| 5 | 0.01 | 1 | 0.01 | 9.1 |
| 6 | 0.01 | 1 | 0.001 | 9.5 |
| 7 | 0.01 | 1 | 0.4 | 6.8 |
| 8 | 0.01 | 1 | 0.4 | 6.7 |

Sample 1 contained no added catalyst promoter system. The copper introduced into samples 2-6, inclusive, was copper chloride. Sample 7 contained copper as copper naphthenate and sample 8 as copper pelargonate.

The gel time was determined by placing the sample in a beaker which was then placed in a 150° F. water bath. The resinous composition was then stirred every 30 seconds for a period of 5 seconds until the resin reached the stage of a "snap back" gel, e. g., the resin is no longer fluid but possesses a jelly like consistency. The length of time required for the resin to reach this stage after immersion in the water bath is called the gel time.

Example 6

The catalyst promotive effect, during the cure of an unsaturated polymerizable polyester, was also shown by adding to different samples of the composition prepared in accordance with Example 1 sufficient copper chloride to yield 0.04 part per million of dissolved metallic copper and 0.01% by weight based on the total weight of (1) phenyl biguanide hydrochloride and (2) ethylene guanidine hydrochloride. Cure of the samples was effected by the addition thereto of 1% by weight of cumene hydroperoxide and the application of heat.

Examples of organic compounds and the salts thereof containing the basic imino group that may be employed as a component of the promoter system in the resinous composition of my invention are such as the guanidines, e. g., 1,2-diphenyl guanidine; diphenyl-p-tolylguanidine hydrochloride; di-o-tolylguanidine; 1,3-dixylylguanidine; dodecylguanidine; 1,3-bis(2-chloro - 4 - methoxyphenyl) guanidine hydrobromide; ethyleneguanidine hydrochloride; 1,1'-(ethylenedi-p-phenylene)diguanidine hydrochloride; 1-ethyl-1,2,3-triphenylguanidine hydrochloride; p-hydroxybenzyl guanidine; methoxyguanidine sulfate; guanidine hydrochloride; N,N-dicyclohexylguanidine hydrochloride; N,N - dicyclohexylguanidine; butyldicyclohexyl guanidine bicarbonate; octylguanidine nitrate; the isomelamines, e. g., 1,3,5-tribenzylisomelamines, triphenylisomelamines; the amidines, e. g., acetamidine, benzamadine, dodecylamidine hydrochloride, acetamidine hydrochloride; the biguanides, e. g., 1,1-bis(2-hydroxyethyl)-3,5-bis(3-methoxypropyl)-biguanide acetate, 1-(p-bromophenyl)-biguanide hydrochloride, p-chlorophenyl biguanide, (3-dibenzofuryl)methylbiguanidine, 1-(p-iodophenyl)biguanidine hydrochloride, (p-methoxyphenyl)-sulfanilylbiguanidine, o-tolylbiguanidine, 1 - (p - chlorophenyl)-5-isopropylbiguanidine, 1 - (2 - dibenzofuryl)biguanidine, phenylbiguanidine hydrochloride, isopropylbiguanidine hydrochloride; the guanylureas, e. g., guanyl-(phenylsulfonyl)guanylurea, 1 - guanyl-2-thioguanylurea carbonate, heptylguanylurea, 1-hexyl - 1 - methyl-guanylurea, (2-hydroxyethyl) guanylurea, 1-(alpha-hydroxybutyryl)guanylurea; the pseudoureas, e. g., 2-(7-chloro-4-methyl-2-guinolyl)-2-thiopseudourea hydrochloride, 2-p-cyanobenzyl-2-thiopseudourea hydrochloride, 2-cyclohexylpseudourea, 2 - decylpseudourea, ethylpseudo-urea, 2 - dodecylpseudourea hydrochloride, 2 - (dodecyloxymethyl) - 2 - thiopseudourea hydrochloride, laurylpseudourea hydrochloride, dimethylallyl pseudourea; the pseudothioureas, e. g., ethylpseudothiourea hydrochloride and ethylpseudothiourea hydrobromides; and the like.

The copper salt employed as the remaining component of the promoter system herein employed may be either an organic or an inorganic salt and may be in either the cuprous or the cupric state. Examples of such compounds are cupric acetate, cupric arsenate, cupric benzoate, cupric carbonate, cupric chloride, cupric fluoride, cupric oleate, cupric sulfate, cuprous bromide, cuprous carbonate, cuprous chloride, cuprous iodide, cuprous sulfate, copper naphthenate, copper pelargonate and the like.

The resinous composition of my invention found particular use in the preparation of laminated articles composed of a filler impregnated with and bonded with the reaction product. In the preparation of the laminated articles, it is customary to impregnate or coat the filler with the liquid polymerizable mixture. These impregnated materials may then be plied together and formed to the desired shape. Heat is usually applied to raise the temperature of the polymerizable mixture to a point where the polymerization will take place. However, by the use of the promoters of my invention, it is possible to polymerize the reaction mixture at room temperature. In order to obtain a faster curing cycle, it is desirable in most cases to apply a slightly elevated temperature.

The resinous composition of my invention also finds employment where castings are to be prepared. In this case the polymerizable mixture is poured into a form of desired shape in which the material is allowed to cure either at room temperature or when subjected to elevated temperatures. In the production of laminated articles wherein the base material is impregnated with the resinous composition, the sheet material may be such as paper, cloth or fibrous glass. Other materials will be apparent to those skilled in the art. Additives such as dyes, pigments or other colorants may also be introduced into the resinous composition in order to obtain a cured product of any desired color. It will also be apparent that when castings are prepared utilizing the resinous composition both filled and unfilled articles may be produced.

I claim:

1. A method of curing a resinous composition which comprises preparing a polymerizable composition of (1) a polymerizable ethylenically unsaturated polyhydric alcohol-polycarboxylic acid polyester; (2) a compound containing a polymerizable $CH_2=C<$ group and having a boiling point of at least 60° C.; (3) from about 0.001 to about 10 parts per million, based on the total weight of (1) and (2), of a copper salt calculated as dissolved metallic copper; and (4) about 0.005–0.2% based on the total weight of a compound selected from the group consisting of the guanidines, isomelamines, amidines, biguanides, guanylureas, pseudoureas, pseudothioureas and the salts thereof, and contacting said composition with a free radical polymerization catalyst.

2. A method of curing a resinous composition which comprises preparing a polymerizable composition of (1) a polymerizable ethylenically unsaturated polyhydric alcohol-polycarboxylic acid polyester; (2) a compound containing a polymerizable $CH_2=C<$ group and having a boiling point of at least 60° C.; (3) from about 0.01 to about 0.5 part per million, based on the total weight of (1) and (2), of a copper salt calculated as dissolved metallic copper; and (4) about 0.005–0.2% based on the total weight of a compound selected from the group consisting of the guanidines, isomelamines, amidines, biguanides, guanylureas, pseudoureas, pseudothioureas and the salts thereof, and contacting said composition with a free radical polymerization catalyst.

3. A method of curing a resinous composition which comprises preparing a polymerizable composition of (1) a polymerizable ethylenically unsaturated polyhydric alcohol-polycarboxylic acid polyester; (2) styrene; (3) from about 0.01 to about 0.5 part per million, based on the total weight of (1) and (2), of a copper salt calculated as dissolved metallic copper; and (4) about 0.005–0.2% based on the total weight of a compound selected from the group consisting of the guanidines, isomelamines, amidines, biguanides, guanylureas, pseudoureas, pseudothioureas and the salts thereof, and contacting said composition with a free radical polymerization catalyst.

4. A method of curing a resinous composition which comprises preparing a polymerizable composition of (1) a polymerizable ethylenically unsaturated polyhydric alcohol-polycarboxylic acid polyester; (2) styrene; (3) from about 0.01 to about 0.5 part per million, based on the total weight of (1) and (2), of copper chloride calculated as dissolved metallic copper; and (4) about 0.005–0.2% based on the total weight of a compound selected from the group consisting of the guanidines, isomelamines, amidines, biguanides, guanylureas, pseudoureas, pseudothioureas and the salts thereof, and contacting said composition with a free radical polymerization catalyst.

5. A method of curing a resinous composition which comprises preparing a polymerizable composition of (1) a polymerizable ethylenically unsaturated polyhydric alcohol-polycarboxylic acid polyester; (2) styrene; (3) from about 0.01 to about 0.5 part per million, based on the total weight of (1) and (2), of copper chloride calculated as dissolved metallic copper; and (4) about 0.005–0.2% based on the total weight of benzamidine hydrochloride and contacting said composition with a free radical polymerization catalyst.

6. A method of curing a resinous composition which comprises preparing a polymerizable composition of (1) a polymerizable ethylenically unsaturated polyhydric alcohol-polycarboxylic acid polyester; (2) styrene; (3) from about 0.01 to about 0.5 part per million, based on the total weight of (1) and (2), of copper chloride calculated as dissolved metallic copper; and (4) about 0.005–0.2% based on the total weight of benzamidine hydrochloride and contacting said composition with cumene hydroperoxide.

7. A polymerizable resinous composition comprising (1) an ethylenically unsaturated polyhydric alcohol-polycarboxylic acid polyester; (2) a compound containing a polymerizable $CH_2=C<$ group and having a boiling point of at least 60° C.; (3) a free radical polymerization catalyst for (1) and (2); (4) about 0.001 to about 10 parts per million, based on the total weight of (1) and (2) of a copper salt calculated as dissolved metallic copper; and (5) about 0.005–0.2% based on the total weight of a compound selected from the group consisting of the guanidines, isomelamines, amidines, biguanides, guanylureas, pseudoureas, pseudothioureas and the salts thereof, as a polymerization promoter.

8. A polymerizable resinous composition comprising (1) an ethylenically unsaturated polyhydric alcohol-polycarboxylic acid polyester; (2) a compound containing a polymerizable $CH_2=C<$ group and having a boiling point of at least 60° C.; (3) a free radical polymerization catalyst for (1) and (2); (4) about 0.01 to about 0.5 part per million based on the total weight of (1) and (2) of a copper salt calculated as dissolved metallic copper; and (5) about 0.005–0.2% based on the total of a compound selected from the group consisting of the guanidines, isomelamines, amidines, biguanides, guanylureas, pseudoureas, pseudothioureas and the salts thereof, as a polymerization promoter.

9. A polymerizable resinous composition comprising (1) an ethylenically unsaturated polyhydric alcohol-polycarboxylic acid polyester; (2) styrene; (3) a free radical polymerization catalyst for (1) and (2); (4) about 0.01–0.5 parts per million based on the total weight of (1) and (2) of a copper salt calculated as dissolved metallic copper; and (5) about 0.005–0.2% based on the total weight of a compound selected from the group consisting of the guanidines, isomelamines, amidines, biguanides, guanylureas, pseudoureas, pseudothioureas and the salts thereof, as a polymerization promoter.

10. A polymerizable resinous composition comprising an ethylenically unsaturated polyhydric alcohol-polycarboxylic acid polyester; (2) styrene; (3) a free radical polymerization catalyst for (1) and (2); (4) about 0.01 to about 0.5 parts per million based on the total weight of (1) and (2) of copper chloride calculated as dissolved metallic copper; and (5) about 0.005–0.2% based on the total weight of a compound selected from the group consisting of the guanidines, isomelamines, amidines, biguanides, guanylureas, pseudoureas, pseudothioureas and the salts thereof, as a polymerization promoter.

11. A polymerizable resinous composition comprising (1) an ethylenically unsaturated polyhydric alcohol-polycarboxylic acid polyester; (2) styrene; (3) a free radical polymerization catalyst for (1) and (2); (4) about 0.01 to about 0.5 parts per million based on the total weight of (1) and (2) of copper chloride calculated as dissolved metallic copper; and (5) about 0.005–0.2% based on the total weight of benzamidine hydrochloride as a polymerization promoter.

12. A polymerizable resinous composition comprising (1) an ethylenically unsaturated polyhydric alcohol-polycarboxylic acid polyester; (2) styrene; (3) cumene hydroperoxide as a free radical polymerization catalyst for (1) and (2); (4) about 0.01 to about 0.5 parts per million based on the total weight of (1) and (2) of copper chloride calculated as dissolved metallic copper; and (5) about 0.05–0.2% based on the total weight of benzamidine hydrochloride as a polymerization promoter.

13. A method of curing a resinous composition which comprises preparing a polymerizable composition of (1) a polymerizable ethylenically unsaturated polyhydric alcohol-polycarboxylic acid polyester; (2) a compound containing a polymerizable $CH_2=C<$ group and having a boiling point of at least 60° C.; (3) from about 0.001 to about 10 parts per million, based on the total weight of (1) and (2), of copper naphthenate calculated as dissolved metallic copper; and about 0.005–0.2% of ethyleneguanidine hydrochloride and contacting said composition with a free radical polymerization catalyst.

14. A polymerizable resinous composition comprising (1) an ethylenically unsaturated polyhydric alcohol-polycarboxylic acid polyester; (2) a compound containing a polymerizable $CH_2=C<$ group and having a boiling point of at least 60° C.; (3) a free radical polymerization catalyst for (1) and (2); (4) about 0.01–0.5 parts per million based on the total weight of (1) and (2) of copper naphthenate calculated as dissolved metallic copper; and (5) about 0.05–0.2% based on the total weight of ethyleneguanidine as a polymerization promoter.

References Cited in the file of this patent

UNITED STATES PATENTS

| | | |
|---|---|---|
| 2,255,313 | Ellis | Sept. 9, 1941 |
| 2,332,898 | D'Alelio | Oct. 26, 1943 |
| 2,380,710 | Stewart | July 31, 1945 |
| 2,430,591 | Stewart | Nov. 11, 1947 |
| 2,452,669 | Levine | Nov. 2, 1948 |
| 2,680,722 | Anderson | June 8, 1954 |

U. S. DEPARTMENT OF COMMERCE
PATENT OFFICE

CERTIFICATE OF CORRECTION

Patent No. 2,822,344             February 4, 1958

George Bliss Duhnkrack

It is hereby certified that error appears in the printed specification of the above numbered patent requiring correction and that the said Letters Patent should read as corrected below.

Column 5, line 33, for "hydrochloric" read -- hydrochloride --; column 8, line 47, after "total" insert -- weight --.

Signed and sealed this 20th day of May 1958.

(SEAL)
Attest:
KARL H. AXLINE
Attesting Officer

ROBERT C. WATSON
Commissioner of Patents